United States Patent
Saitou

(10) Patent No.: US 9,334,420 B2
(45) Date of Patent: *May 10, 2016

(54) DECORATED SHEET AND DECORATED RESIN MOLDED ARTICLE USING SAME

(75) Inventor: Nobuo Saitou, Saitama (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/008,056

(22) PCT Filed: Mar. 23, 2012

(86) PCT No.: PCT/JP2012/057618
§ 371 (c)(1),
(2), (4) Date: Sep. 27, 2013

(87) PCT Pub. No.: WO2012/133235
PCT Pub. Date: Oct. 4, 2012

(65) Prior Publication Data
US 2014/0018495 A1 Jan. 16, 2014

(30) Foreign Application Priority Data

Mar. 30, 2011 (JP) ................ 2011-076826
Apr. 13, 2011 (JP) ................ 2011-089534

(51) Int. Cl.
*C09D 175/14* (2006.01)
*B32B 27/40* (2006.01)
(Continued)

(52) U.S. Cl.
CPC ............ *C09D 175/14* (2013.01); *C08J 7/042* (2013.01); *C08F 290/067* (2013.01);
(Continued)

(58) Field of Classification Search
CPC ..... C09D 175/14; C09D 175/16; C08J 7/042; C08J 2469/00; C08J 2475/00; C08J 2325/10; C08J 2325/12; C08J 2433/00; C08F 290/067; C08F 222/10; Y10T 428/3158; Y10T 428/31583; Y10T 428/31587; Y10T 428/31645
USPC ......................................... 428/423.1; 524/590
See application file for complete search history.

(56) References Cited

U.S. PATENT DOCUMENTS 5,143,997 A * 9/1992 Endo et al. ............... 528/60
5,158,924 A * 10/1992 Konagaya et al. ........ 503/201
(Continued)

FOREIGN PATENT DOCUMENTS

JP 50-19132 2/1975
JP 61-17255 1/1986
(Continued)

OTHER PUBLICATIONS

Chinese Official Action dated Sep. 28, 2014, for CN Application No. 201280016766.8.
(Continued)

*Primary Examiner* — Thao T Tran
(74) *Attorney, Agent, or Firm* — Fitch, Even, Tabin & Flannery LLP

(57) ABSTRACT

The decorative sheet includes a surface protection layer and a substrate at least, the surface protection layer being provided on the substrate, in which the surface protection layer consists of a cured material of an ionizing radiation curable resin composition at least containing a urethane(meth)acrylate with a polycarbonate skeleton (A) and a multi-functional (meth)acrylate (B) in a mass ratio ((A)/(B)) of (98/2)-(70/30).

12 Claims, 1 Drawing Sheet

(51) Int. Cl.
*C08J 7/04* (2006.01)
*C08F 290/06* (2006.01)

(52) U.S. Cl.
CPC ......... *C08J 2325/10* (2013.01); *C08J 2325/12* (2013.01); *C08J 2433/00* (2013.01); *C08J 2469/00* (2013.01); *C08J 2475/00* (2013.01)

(56) References Cited

U.S. PATENT DOCUMENTS

| | | | | |
|---|---|---|---|---|
| 5,401,348 | A * | 3/1995 | Oguchi et al. | 156/247 |
| 5,924,912 | A * | 7/1999 | Takehana et al. | 451/29 |
| 6,449,413 | B1 * | 9/2002 | Duecker | 385/115 |
| 2010/0003523 | A1 * | 1/2010 | Sharygin et al. | 428/412 |
| 2010/0272980 | A1 | 10/2010 | Kowata et al. | |
| 2011/0274908 | A1 | 11/2011 | Kowata et al. | |
| 2013/0309460 | A1 * | 11/2013 | Saitou et al. | 428/195.1 |

FOREIGN PATENT DOCUMENTS

| | | |
|---|---|---|
| JP | 01-161010 A | 6/1989 |
| JP | 6-134859 | 5/1994 |
| JP | 6-145276 | 5/1994 |
| JP | 09-286835 A | 11/1997 |
| JP | 2000-102949 A | 4/2000 |
| JP | 2004-217809 | 8/2004 |
| JP | 2004-322501 | 11/2004 |
| JP | 2007-030479 | 2/2007 |
| JP | 2009-227915 | 10/2009 |
| JP | 2010-222568 | 10/2010 |
| JP | 2010-234736 A | 10/2010 |
| JP | 2010-234813 | 10/2010 |
| JP | 2011-73373 | 4/2011 |
| JP | 2011-208097 | 10/2011 |
| JP | 2012-46566 | 3/2012 |
| WO | 2009/081881 A1 | 7/2009 |

OTHER PUBLICATIONS

Japanese Official Action dated Oct. 14, 2014, for JP Application No. 2011-089534.

Office Action mailed Jan. 20, 2015, for Japanese Application No. 2011-089534, together with English language translation thereof.

* cited by examiner

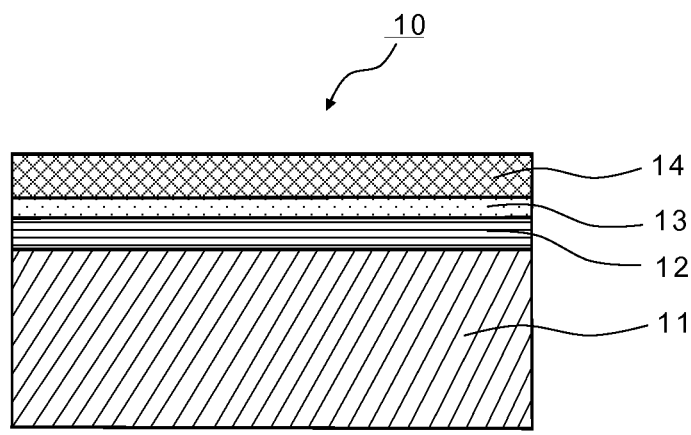

DECORATED SHEET AND DECORATED RESIN MOLDED ARTICLE USING SAME

TECHNICAL FIELD

The present invention relates to a decorative sheet with a surface protection layer consisting of a cured material of a specific ionizing radiation curable resin composition.

BACKGROUND ART

A decorative resin-molded article decorated by laminating a decorative sheet provided on the surface of a molded article is used in various applications such as automotive interior parts. The method of forming such a decorative resin-molded article includes insert molding in which a decorative sheet is previously three-dimensionally formed with a vacuum forming mold, and then the molded sheet is inserted in an injection mold and then a fluidized resin is injected in the injection mold to integrate this resin with the molded sheet (for example, Patent document 1); and simultaneous injection-molding and decorating in which a decorative sheet inserted in a mold is integrated with a melted resin injected in a cavity during injection molding to decorate the surface of the resin compact (for example, Patent documents 2 and 3).

The above-mentioned decorative resin-molded article is provided with a surface protection layer in order to improve the damage resistance on the surface. However, the above-mentioned method of forming such a decorative resin-molded article has a problem in the process of three-dimensionally forming a decorative previously sheet with a vacuum forming mold in insert molding and in the process of drawing and firmly attaching a decorative sheet along the inner periphery of the cavity during preforming or during injecting a melted resin in simultaneous injection-molding and decorating. Specifically, the decorative sheet will be drawn more than minimum requirement to fit the shape of the mold due to the effect of vacuum or compressed air or due to the tension or the like generated by the pressure and the shear stress of the melted resin, resulting in a crack generated on the surface protection layer of the curved surface of a molded article.

To approach the above-mentioned problem, an ionizing radiation curable resin such as an ultraviolet curable resin has been used as the surface protection layer for increase the cross-link density of the resin forming the surface protection layer of a decorative sheet so as to attempt to improve the abrasion resistance and the damage resistance of the surface of a decorative molded article. However, the problem of a crack generated on the curved surface of a molded article during the forming still exists.

Alternatively, an ionizing radiation curable resin such as an ultraviolet curable resin used as the surface protection layer has been attempted to be half-cured at the stage of a decorative sheet and then fully cured after decorative molding (Patent document 4). However, problems are created, in which the surface protection layer containing an uncured resin component is easily damaged and hardly handled and in which the mold is contaminated due to the uncured resin component adhering to the mold. To solve these problems, a protection film may be provided on a half-cured surface protection layer. However, this complicates the manufacturing process and causes the cost increases.

CITATION LIST

Patent document 1: JP 2004-322501 A
Patent document 2: JP 50-19132 A
Patent document 3: JP 61-17255 A
Patent document 4: JP 06-134859 A

DISCLOSURE OF THE INVENTION

The applicant had a patent application previously on a decorative sheet including a surface protection layer consisting of a cured material of an ionizing radiation curable resin composition containing a polycarbonate(meth)acrylate and a multi-functional (meth)acrylate in a specific mass ratio as a decorative sheet with a surface protection layer having damage resistance as well as three-dimensional moldability (JP 2009-229015 A).

This decorative sheet has a surface protection layer having damage resistance as well as three-dimensional moldability. However, the damage resistance and the three-dimensional moldability are desired to be further improved.

The present invention is achieved in view of the above-mentioned conventional problems. The objective of the present invention is to provide a decorative sheet including a surface protection layer with damage resistance and three-dimensional moldability in a high level and a decorative resin-molded article formed by using the decorative sheet.

As a result from the extensive studies to achieve a solution to the above-mentioned problems, the inventor have found that the surface protection layer of a decorative sheet consists of a cured material of a specific ionizing radiation curable resin composition can solve this problem. The present invention is achieved based on this finding.

The present invention provides:

(1) a decorative sheet including a surface protection layer and a substrate at least, the surface protection layer being provided on the substrate, in which the surface protection layer consists of a cured material of an ionizing radiation curable resin composition at least containing a urethane (meth)acrylate with a polycarbonate skeleton (A) and a multi-functional (meth)acrylate (B) in a mass ratio ((A)/(B)) of (98/2)-(70/30); and (2) a decorative resin-molded article formed by using the decorative sheet.

The decorative sheet of the present invention can provide a decorative sheet with easy three-dimensional moldability with no cracks being generated on the surface protection layer in insert molding and in simultaneous injection-molding and decorating because the surface protection layer has excellent damage resistance as well as excellent three-dimensional moldability in a high level.

BRIEF DESCRIPTION OF THE DRAWINGS

FIG. 1 shows a pattern diagram illustrating the cross section of an aspect of the decorative sheet of the present invention.

PREFERRED MODE FOR CARRYING OUT THE INVENTION

The decorative sheet of the present invention includes a surface protection layer and a substrate at least, the surface protection layer being provided on the substrate, in which the surface protection layer consists of a cured material of an ionizing radiation curable resin composition at least containing a urethane(meth)acrylate with a polycarbonate skeleton (A) and a multi-functional (meth)acrylate (B) in a mass ratio ((A)/(B)) of (98/2)-(70/30).

The ionizing radiation curable resin composition is referred to as a composition containing an ionizing radiation curable resin. The ionizing radiation curable resin has an energy quantum capable of cross-linking and polymerizing molecules in electromagnetic radiation or charged particle radiation. Specifically, the ionizing radiation curable resin composition is cross-linked and cured by being irradiated with ultraviolet rays or electron beams.

In the present invention, a cured material of an ionizing radiation curable resin composition at least containing a urethane(meth)acrylate with a polycarbonate skeleton (A) and a multi-functional (meth)acrylate (B) in a mass ratio ((A)/(B)) of (98/2)-(70/30) is used as the surface protection layer. If this mass ratio is more than 98/2 (in other words, the amount of the urethane(meth)acrylate with a polycarbonate skeleton is more than 98 mass %), the toughness of the coated film decreases, causing the coat film to be softened, the damage resistance decreases, and the solvent resistance and the chemical resistance also decrease. If the mass ratio is less than 70/30 (in other words, the amount of the urethane(meth) acrylate with a polycarbonate skeleton is less than 70 mass %), the coated film is hardened, and the three-dimensional moldability decreases. In the present invention, the mass ratio is more preferably 95/5-80/20, further more preferably 95/5-85/15.

In the present invention, "(meth)acrylate" means "acrylate or methacrylate." Other similar terms are also regarded as synonymous in this way.

Urethane(Meth)Acrylate with a Polycarbonate Skeleton (A)

The urethane(meth)) acrylate with a polycarbonate skeleton (A) used in the present invention is not limited in particular. However, from the viewpoint of improving the damage resistance and the three-dimensional moldability, the weight-average molecular weight is preferably 500 or more, more preferably 1,000 or more, further more preferably more than 2,000. The upper limit of the weight-average molecular weight is not limited in particular, but preferably 100,000 or less, more preferably 50,000 or less from the viewpoint of controlling the viscosity not to be increased too much. From the viewpoint of maintaining the damage resistance as well as the three-dimensional moldability, the upper limit of the weight-average molecular weight is further more preferably more than 2,000 and 50,000 or less, particularly preferably 5,000-20,000.

The weight-average molecular weight herein was measured by GPC analysis and converted into a standard polystyrene equivalent.

This urethane(meth)acrylate with a polycarbonate skeleton has preferably two or more functional groups of ethylene unsaturated bonds in a molecule from the viewpoint of cross-linking and curing.

The urethane(meth)acrylate with a polycarbonate skeleton used in the present invention is easily produced by reacting a polyol with a polycarbonate skeleton, an organic polyisocyanate compound, and a hydroxy(meth)acrylate.

Polyol with Polycarbonate Skeleton

The polyol with a polycarbonate skeleton used to produce the urethane(meth)acrylate with a polycarbonate skeleton includes polymers having a carbonate bond in the polymer main chain and further having 2 or more, preferably 2-50, more preferably 2-10 hydroxyl groups at the end or the side chain. Among these, a diol with a polycarbonate skeleton, which is industrially easily obtainable at relatively low price, are preferable.

A typical process of generating a polyol with a polycarbonate skeleton includes polymerizing a diol compound (X) and/or a trivalent or higher polyvalent alcohol (Y) with a compound to be the carbonyl component (Z).

The diol with a polycarbonate skeleton can be generated by polymerizing each components (X), (Y), and (Z). However, from the viewpoint of the efficient production, the diol with a polycarbonate skeleton is preferably produced by polymerizing the diol compound (X) and compound to be a carbonyl component (Z).

The diol compound (X) used as the raw material is represented by the general formula HO—$R^1$—OH. $R^1$ is a divalent hydrocarbon group with 2-20 carbon atoms and may include an ether bond. For example, $R^1$ includes a normal or branched alkylene, a cyclohexylene, and a phenylene groups.

The diol compound (X) includes ethylene glycol, 1,2-propylene glycol, diethylene glycol, dipropylene glycol, triethylene glycol, polyethylene glycol, neopentyl glycol, 1,3-propanediol, 1,4-butanediol, 1,5-pentanediol, 3-methyl-1,5-pentanediol, 1,6-hexanediol, 1,8-octanediol, 1,3-bis(2-hydroxyethoxy)benzene, 1,4-bis(2-hydroxyethoxy)benzene, neopentyl glycol, 1,4-cyclohexanediol, 1,4-cyclohexanedimethanol, and a low-molecular diol of an adduct in which bisphenol A is reacted with an alkylene oxide such as ethylene oxide or propylene oxide. Among these, 1,4-butanediol and 1,6-hexanediol are preferable. These diol compounds (X) may be used alone or in combination with two or more kinds.

The trivalent or higher polyvalent alcohol (Y) includes trimethylolpropane, trimethylolethane, pentaerythritol, ditrimethylolpropane, dipentaerythritol, glycerin, and sorbitol. The trivalent or higher polyvalent alcohol may have a hydroxyl group in which ethylene oxide, propylene oxide, or other alkylene oxides are added in an equivalent of 1-5 based on the hydroxyl groups of each of these polyvalent alcohols. These polyvalent alcohols may be used alone or in combination with two or more kinds.

The compound to be the carbonyl component (Z) includes diester carbonate, phosgene, and these equivalents of thereof. Specifically, the compound includes diester carbonates such as dimethyl carbonate, diethyl carbonate, diisopropyl carbonate, ethylene carbonate, and propylene carbonate; phosgene; and halogenated formates such as methyl chloroformate, ethyl chloroformate, and phenyl chloroformate. The diester carbonate may be a diaryl carbonate such as diphenyl carbonate. The compound to be the carbonyl component (Z) may be used alone or in combination with two or more kinds.

The polycarbonate polyol is synthesized by the polycondensation of the diol compound (X) and/or the trivalent or higher polyvalent alcohol (Y) with the compound to be the carbonyl component (Z) under a general condition.

In the condensation polymerization of these three components (X), (Y), and (Z), the molar ratio of the compound to be the carbonyl component (Z) to the diol compound (X) and the polyvalent alcohol (Y) is preferably 0.2-2 equivalents based on the hydroxyl groups of the diol compound (X) and the polyvalent alcohol (Y).

When the two components (diol compound (X) and compound to be a carbonyl component (Z)) are polymerized to produce a diol with a polycarbonate skeleton, the molar ratio of the compound to be the carbonyl component (Z) to the diol compound (X) is preferably 0.2-2 equivalents based on the hydroxyl groups of the diol compound (X).

The equivalent number (eq./mol) of the hydroxyl groups existing in the polyol with a polycarbonate skeleton after the polycondensation conducted at the above-mentioned molar ratio is 2 or more, preferably 2-50, more preferably 2-10 on average in one molecule. This range generates the sufficient number of the (meth)acrylate groups and provides moderate flexibility to the polyol with a polycarbonate skeleton. The terminal functional groups of this polyol with a polycarbonate skeleton are typically hydroxyl (OH) groups, but some of which may be carbonate groups.

Organic Polyisocyanate Compound

The organic polyisocyanate compound is preferably non-yellowing types, including isophorone diisocyanate, hexamethylene diisocyanate, 4,4-dicyclohexylmethane diisocyanate, and trimethyl hexamethylene diisocyanate.

Hydroxy(Meth)Acrylate

The hydroxy(meth)acrylate is preferably 2-hydroxyethyl (meth)acrylate, 2-hydroxypropyl(meth)acrylate, or caprolactone-modified-2-hydroxyethyl(meth)acrylate.

In the present invention, a plurality of urethane(meth)acrylates with a polycarbonate skeleton, the weight-average molecular weights and the structures of the structural units of which are different, may be mixed.

Multi-Functional (Meth)Acrylate Monomer (B)

The multi-functional (meth)acrylate used in the present invention is not limited in particular as long as being a (meth) acrylate with two or more functional groups. However, a (meth)acrylate with three or more functional groups is preferable from the viewpoint of the curability. The two functional groups means herein that the number of ethylene unsaturated bonds {(meth)acryloyl groups} in a molecule is two.

The multi-functional (meth)acrylate may be an oligomer or a monomer. However, the multi-functional (meth)acrylate is preferably a multi-functional (meth)acrylate oligomer from the viewpoint of improving the three-dimensional moldability.

The above-mentioned multi-functional (meth)acrylate oligomer includes, for example, a urethane(meth)acrylate oligomer, an epoxy(meth)acrylate oligomer, a polyester(meth) acrylate oligomer, and a polyether(meth)acrylate oligomer. The urethane(meth)acrylate oligomer can be obtained, for example, by esterifying a (meth)acrylic acid with a polyurethane oligomer obtained by reacting a polyetherpolyol or a polyester polyol with a polyisocyanate. The epoxy(meth) acrylate oligomer can be obtained, for example, by esterifying a (meth)acrylic acid with the oxirane ring of a bisphenol epoxy resin or a novolac epoxy resin with a relatively low molecular weight. A carboxyl modified-epoxy(meth)acrylate oligomer obtained by partially modifying this epoxy(meth) acrylate oligomer with a dibasic carboxylic acid anhydride can be used. The polyester(meth)acrylate oligomer can be obtained, for example, by esterifying a (meth)acrylic acid with the hydroxyl groups of a polyester oligomer having hydroxyl groups at the both ends that has been obtained by condensing a polyvalent carboxylic acid with a polyvalent alcohol or by esterifying a (meth)acrylic acid with a hydroxyl groups at the end of an oligomer obtained by adding an alkylene oxide to a polyvalent carboxylic acid. The polyether (meth)acrylate oligomer can be obtained by esterifying a (meth)acrylic acid with the hydroxyl groups of a polyetherpolyol.

Other multi-functional (meth)acrylate oligomers include a high hydrophobic polybutadiene(meth)acrylate oligomer with a (meth)acrylate group in the side chain of a polybutadiene oligomer; a silicone(meth)acrylate oligomer and a silicone-modified urethane(meth)acrylate oligomer which have a polysiloxane bond in the main chain; and an aminoplast resin (meth)acrylate oligomer in which an aminoplast resin with a large number of reactive groups in the small molecular is modified. Among these, from the viewpoint of the damage resistance, the three-dimensional moldability, and the slippage, a silicone-modified urethane(meth)acrylate oligomer is preferable.

The above-mentioned multi-functional (meth)acrylate monomer includes, specifically, ethylene glycol di(meth) acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth) acrylate, hydroxy pivalic acid neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, allylated cyclohexyl di(meth)acrylate, isocyanurate di(meth)acrylate, trimethylolpropane tri(meth)acrylate, ethylene oxide-modified trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(acryloxyethyl) isocyanurate, propionic acid-modified dipentaerythritol penta(meth)acrylate, dipentaerythritol hexa (meth)acrylate, ethylene oxide-modified dipentaerythritol hexa(meth)acrylate, caprolactone-modified dipentaerythritol hexa(meth)acrylate, urethane(meth)acrylate, and silicone-modified urethane(meth)acrylate. Among these, urethane (meth)acrylate and silicone-modified urethane(meth)acrylate are preferable. From the viewpoint of improving the damage resistance of the decorative sheet, silicone-modified urethane (meth)acrylate is more preferable.

The above-mentioned multi-functional (meth)acrylate oligomers and monomers may be used alone or in combination of two or more kinds.

In the present invention, a monofunctional (meth)acrylate can be optionally used together with the polyfunctional (meth)acrylate for the purpose of decreasing the viscosity without departing from the scope of the present invention. The monofunctional (meth)acrylate includes, for example, methyl(meth)acrylate, ethyl(meth)acrylate, propyl(meth) acrylate, butyl(meth)acrylate, pentyl(meth)acrylate, hexyl (meth)acrylate, cyclohexyl(meth)acrylate, 2-ethylhexyl (meth)acrylate, lauryl(meth)acrylate, stearyl(meth)acrylate, and isobornyl(meth)acrylate. These monofunctional (meth) acrylates may be used alone or in combination of two or more kinds.

When an ultraviolet curable resin composition is used as the ionizing radiation curable resin composition, a photopolymerization initiator is preferably added in a content of about 0.1-5 parts by mass based on 100 parts by mass of the ultraviolet curable resin. The photopolymerization initiator can be optionally selected from conventionally used ones without particular limitation, including, for example, benzoin, benzoin methyl ether, benzoin ethyl ether, benzoin isopropyl ether, benzoin-n-butyl ether, benzoin isobutyl ether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)phenyl]-2-moruforino-puropan-1-one, 4-(2-hydroxyethoxy)phenyl-2(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-tertiary-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, and acetophenone dimethyl ketal.

For example, a photosensitizer based on a p-dimethylbenzoic acid ester, a tertiary amine, a thiol, or the like can be used.

In the present invention, an electron beam curable resin composition is preferably used as the ionizing radiation curable resin composition. The electron beam curable resin composition is allowed to be solventless and preferred from the viewpoint of environment and health. Furthermore, the electron beam curable resin composition provides stable curability without a photopolymerization initiator.

In the ionizing radiation curable resin composition forming the surface protection layer in the present invention, various additives can be mixed according to the desired physical properties of a cured resin layer to be obtained. These additives include, for example, a weather resistance improver, an abrasion resistance enhancer, a polymerization inhibitor, a cross-linking agent, an infrared absorbent, an antistatic agent, an adhesion enhancer, a leveling agent, a thixotropic agent, a coupling agent, a plasticizer, an antifoaming agent, a filler, a solvent, and a colorant.

As the weather resistance improver, an ultraviolet absorber or a photostabilizer can be used. The ultraviolet absorber may be inorganic or organic. As the inorganic ultraviolet absorber, titanium dioxide, cerium oxide, and zinc oxide, which have an average particle size of about 5-120 nm, can preferably be used. The organic ultraviolet absorber is based on, for example, a benzotriazole, specifically including 2-(2-hydroxy-5-methylphenyl)benzotriazole, 2-(2-hydroxy-3,5-di-tert-amylphenyl)benzotriazole, and 3-[3-(benzotriazole-2-yl)-5-tert-butyl-4-hydroxyphenyl]propionic acid ester of polyethylene glycol. The photostabilizer is based on, for example, a hindered amine, specifically including 2-(3,5-di-tert-butyl-4-hydroxybenzyl)-2'-n-butylmalonic acid bis(1,2,2,6,6-pentamethyl-4-piperidyl), bis(1,2,2,6,6-pentamethyl-4-piperidyl)sebacate, and tetrakis(2,2,6,6-tetramethyl-4-piperidyl)-1,2,3,4-butane tetracarboxylate. Furthermore, a reactive ultraviolet absorber and a reactive photostabilizer that have a polymerizable group such as a (meth)acryloyl group in the molecule can be used. The ultraviolet absorber and the photostabilizer can be copolymerized without impairing the properties (damage resistance and three-dimensional moldability) as the surface protection layer consisting of the polymer according to the present invention.

The abrasion resistance enhancer includes, for example, spherical particles of inorganic substances such as α-alumina, silica, kaolinite, iron oxide, diamond, and silicon carbide. The shape of particle is not limited in particular but includes a sphere, an ellipsoid, a polyhedron, and a scale, which is preferably a sphere. The particles of organic substances include beads consisting of a synthetic resin such as a cross-linked acrylic resin or a polycarbonate resin. The particle size is typically about 30-200% of the film thickness. Particularly, spherical α-alumina is preferable in terms of the high hardness, the large effect on the improvement of the abrasion resistance, and the easy obtainability of the spherical particles.

As the polymerization inhibitor, for example, hydroquinone, p-benzoquinone, hydroquinone monomethyl ether, pyrogallol, t-butylcatechol, and the like are used. As the cross-linking agent, for example, a polyisocyanate compound, an epoxy compound, a metal chelate compound, an aziridine compound, an oxazoline compound, and the like are used.

As the filler, for example, barium sulfate, talc, clay, calcium carbonate, aluminium hydroxide, and the like are used.

As the colorant, for example, well-known color pigments such as quinacridone red, isoindolinone yellow, phthalocyanine blue, phthalocyanine green, titanium oxide, and carbon black, and the like are used.

As the infrared absorbent, for example, a dithiol metal complex, a phthalocyanine compound, a diimmonium compound, and the like are used.

In the present invention, from the viewpoint of improving the slippage of the decorative sheet, a reactive silicone with a radical polymerizable group such as (meth)acrylate or non-reactive silicone oil containing no radical polymerizable groups may be added to the end and/or the side chain.

The additive composed of such a silicone is preferably added in a content of 0.1-5 parts by mass based on 100 parts by mass of the ionizing radiation curable resin composition.

The configuration of the decorative sheet of the present invention will be explained in detail in reference to FIG. 1.

FIG. 1 shows a pattern diagram illustrating the cross section of an aspect of the decorative sheet 10 of the present invention used for insert molding. In the example shown in FIG. 1, an image layer 12, a primer layer 13, and a surface protection layer 14 are sequentially laminated on a substrate 11. The surface protection layer 14 is formed by cross-linking and curing the above-mentioned ionizing radiation curable resin composition.

The substrate 11 is selected in consideration of the vacuum formability, and a resin sheet consisting of a thermoplastic resin is therefore typically used. As the thermoplastic resin, an acrylonitrile-butadiene-styrene resin (hereinafter referred to as "ABS resin"), an acrylic resin; polyolefin resins such as a polypropylene and polyethylene; a polycarbonate resin; a vinyl chloride resin, and the like are generally used. For the substrate 11, single-layer sheets of these resins or multilayer sheets of the same or different resins can be used.

The thickness of the substrate is selected based on the application, typically about 0.05-1.0 mm, more typically about 0.1-0.7 mm in consideration of the cost and the like.

These substrates can be subjected to physical or chemical surface treatment by oxidation, unleveling, or the like to improve the adhesion to the layer provided on the sheet on one side or both sides, if desired.

The oxidation includes, for example, the corona discharge, chromium oxidation, flame, hot air, and ultraviolet-ozone treatments. The unleveling includes, for example, sandblasting and solvent treatments. These surface treatments are optionally selected depending on the type of substrate. Generally, corona discharge treatment is preferably used from the viewpoint of the effect, the operability, and the like.

On the substrate, a primer layer may be formed, painting may be applied for adjusting the color, or a designed pattern may previously be formed.

The image layer 12 shown in FIG. 1 provides decoration to a decorative resin-molded article, which is formed by printing various patterns with ink and a printer. The pattern includes a wood grain pattern, a pebble grain pattern imitating the surface of rock such as marble (for example, travertine marble), a texture grain pattern imitating texture and cloth, a tilling pattern, and a brickwork pattern, as well as a mosaic and a patchwork patterns made by mixing together these patterns. These patterns are formed by process printing using typical process colors: yellow, red, blue, and black. These patterns are also each formed by process printing characterized by preparing printing plates corresponding to the colors composing these respective patterns.

As the design ink used for the image layer 12, colorants such as a pigment and a dye, an extender pigment, a solvent, a stabilizer, a plasticizer, a catalyst, and a hardener, which are optionally mixed in a binder, are used. The binder is used without limitation in particular. For example, a polyurethane resin, a vinyl chloride-vinyl acetate copolymer resin, a vinyl chloride-vinyl acetate-acrylic copolymer resin, a chlorinated polypropylene resin, an acrylic resin, a polyester resin, a polyamide resin, a butyral resin, a polystyrene resin, a nitrocellulose resin, a cellulose acetate resin, and the like are optionally used alone or in combination with two or more kinds.

As the colorant, inorganic pigments such as carbon black (Indian ink), iron black, titanium white, antimony white, chrome yellow, titanium yellow, red iron oxide, cadmium red, ultramarine blue, and cobalt blue; organic pigments or dyes such as quinacridone red, isoindolinone yellow, and phthalocyanine blue; a metallic pigment consisting of scale-like foil of aluminum, brass, or the like; a pearlescent (pearl) pigment consisting of scale-like foil of titanium dioxide-coated mica, basic lead carbonate, or the like; and others are used.

The decorative sheet 10 of the present invention may be provided with a hiding layer (not shown) between the substrate 11 and the image layer 12, if desired. The hiding layer is provided so as to avoid the color change or variation of the surface of the substrate 11 from affecting the color of the pattern of the decorative sheet 10. The hiding layer is often formed in an opaque color. A so-called solid print layer with a thickness of 1-20 µm is suitably used for the hiding layer.

To hardly cause a minute crack and whitening on the drawn part of the surface protection layer 14, the decorative sheet 10 of the present invention can be provided with the primer layer 13 between the image layer 12 and the surface protection layer 14, if desired. As the primer composition forming the primer layer 13, a (meth)acrylic resin, a urethane resin, a (meth)acrylic-urethane copolymer resin, a vinyl chloride-vinyl acetate copolymer, a polyester resin, a butyral resin, a chlorinated polypropylene, and a chlorinated polyethylene are used. These resins may be used alone or in combination of two or more kinds.

Among these resins, a urethane resin, a (meth)acrylic resin, and a (meth)acryl-urethane copolymer resin are preferable. From the viewpoint of the adhesion to image layer 12 and the surface protection layer 14, a cross-linking agent is preferably used for the formation of the primer layer 13. Specifically, the primer layer 13 in the present invention is preferably composed of a two-liquid curable material mixing an isocyanate as the cross-linking agent or hardener with a polyol.

The (meth)acrylic resin includes a homopolymer of (meth)acrylic acid ester, a copolymer of two or more different kinds of (meth)acrylic acid ester monomers, and a copolymer of a (meth)acrylic acid ester and other monomers. Specifically, a (meth)acrylic resin consisting of a homopolymer or a copolymer containing a (meth)acrylic acid ester, such as poly(meth)acrylic acid methyl, poly(meth)acrylic acid ethyl, poly(meth)acrylic acid propyl, poly(meth)acrylic acid butyl, a (meth)acrylic acid methyl-(meth)acrylic acid butyl copolymer, a (meth)acrylic acid ethyl-(meth)acrylic acid butyl copolymer, an ethylene-(meth)acrylic acid methyl copolymer, or a styrene-(meth)acrylic acid methyl copolymer, is suitably used.

As the urethane resin, a polyurethane consisting of polyol (polyvalent alcohol) as the base compound and isocyanate as the cross-linking agent (curing agent) can be used. The polyol has two or more hydroxyl groups in the molecule.

For example, a polyester polyol, a polyethylene glycol, a polypropylene glycol, an acrylic polyol, a polyether polyol, a polycarbonate polyol, and the like are used. As the isocyanate, a polyvalent isocyanate with two or more isocyanate groups in the molecule; an aromatic isocyanate such as 4,4-diphenylmethane diisocyanate; and aliphatic (or alicyclic) isocyanates such as hexamethylene diisocyanate, isophorone diisocyanate, hydrogenated tolylene diisocyanate, and hydrogenated diphenylmethane diisocyanate are used. The urethane resin can be combined with a butyral resin.

In the present invention, from the viewpoints of improving the adhesions to the image layer 12 and to the surface protection layer 14 after cross-linking and of improving the physical properties and the moldability, polyols such as an acrylic polyol, polycarbonate polyol, and polyester polyol are preferably appropriately combined with a cross-linking agent such as hexamethylene diisocyanate or 4,4-diphenylmethane diisocyanate. Among these, an acrylic polyol is preferably combined with hexamethylene diisocyanate.

The (meth)acrylic-urethane copolymer resin is preferably, for example, an acrylic/urethane (polyester urethane) block copolymer resin. As the curing agent, the above-mentioned various isocyanates are used. In the acrylic-urethane (polyester urethane) block copolymer resin, the ratio (mass ratio) of acryl/urethane is preferably adjusted to (9/1)-(1/9), more preferably (8/2)-(2/8), if desired. Since it can be used for various decorative sheets, this acrylic-urethane (polyester urethane) block copolymer resin is particularly preferable as the resin used for the primer composition.

To the primer layer 13, a well-known weather resistant improver, adhesion improver, leveling agent, thixotropic agent, anti-blocking agent, plasticizer, antifoaming agent, filler, solvent, and colorant may optionally be added.

To improve the adhesion to the injection resin, the decorative sheet 10 of the present invention can be provided with a back surface (opposite to the surface protection layer 14) adhesive layer (not shown) of the decorative sheet 10, if desired. For the adhesive layer, a thermoplastic resin or a curable resin is used according to the injection resin. The thermoplastic resin includes an acrylic resin, an acrylic modified polyolefin resin, a chlorinated polyolefin resin, a vinyl chloride-vinyl acetate copolymer, a thermoplastic urethane resin, a thermoplastic polyester resin, a polyamide resin, and a rubber resin. These can be used alone or in combination with two or more kinds. The thermosetting resin includes a urethane resin and an epoxy resin.

The surface protection layer 14 is formed by preparing, applying, cross-linking, and curing an application liquid containing the above-mentioned ionizing radiation curable resin composition. The viscosity of the application liquid is not limited in particular as long as being capable of forming an uncured resin layer on the surface of the substrate by the below-mentioned application process.

In the present invention, from the three-dimensional moldability, a prepared application liquid is applied to the surface of the image layer 12 or the primer layer 13 by well-known methods such as gravure coating, bar coating, roll coating, reverse roll coating, and comma coating, preferably gravure coating to form an uncured resin layer so as to form an uncured resin layer with a thickness of 1-1000 µm after curing.

In the present invention, the uncured resin layer formed in this way is cured by being irradiated with ionizing radiation such as electron beams or ultraviolet rays. When electron beams are used as the ionizing radiation, the accelerating voltage can appropriately be selected based on the resin to be used and the thickness of the layer. However, the uncured resin layer is typically preferably cured at an accelerating voltage of about 70-300 kV.

In the irradiation with electron beams, the higher accelerating voltage increases the penetrating power more. When a substrate deteriorated by electron beams is used as the substrate 11, the accelerating voltage is selected so that the penetration depth of electron beams is substantially equal to the thickness of the resin layer. Therefore, the substrate 11 can be prevented from being excessively irradiated with electron beams to minimize the deterioration of the substrate being caused by excess electron beams.

The irradiation dose when the crosslink density of the resin composition layer is saturated is preferable, which is selected from the range of typically 5-300 kGy (0.5-30 Mrad), preferably 10-50 kGy (1-5 Mrad).

The electron beam source is not limited in particular. For example, various electron beam accelerators such as a Cockcroft-Walton accelerator, a van de Graaff accelerator, a resonance transformer accelerator, an insulated core transformer accelerator, a linear accelerator, a dynamitron accelerator, and a high frequency accelerator can be used.

When used as the ionizing radiation, the ultraviolet rays are emitted at a wavelength of 190-380 nm. The ultraviolet ray source is not limited in particular. For example, a high-pressure mercury lamp, a low-pressure mercury lamp, a metal halide lamp, and a carbon-arc lamp are used.

To the cured resin layer formed in this way, various additives are added to provide various functions, for example, with high hardness and damage resistance, such as hard coating function, antifog coating function, antifouling coating function, anti-glare coating function, antireflection coating function, ultraviolet screen coating function, and infrared screen coating function.

In the present invention, the surface protection layer 14 preferably has a thickness of 1-1000 µm after curing. The surface protection layer 14 with a thickness of 1 µm or more after curing obtains sufficient physical properties such as the damage resistance and the weatherability as a protection layer. On the other hand, the surface protection layer 14 with a thickness of 1000 µm or less after curing has an economical advantage because it is uniformly cured by easily uniformly being irradiated with ionizing radiation.

The surface protection layer 14 with a thickness of preferably 1-50 µm, more preferably 1-30 µm can improve the three-dimensional moldability to provide high shape following capability to a complex three dimensional shape for use in an automotive interior and the like. Therefore, even if a hard ionizing radiation curable resin is combined the decorative sheet of the present invention can exhibit excellent three-dimensional moldability and can harden the coating film without impairing the three-dimensional moldability. As the result, the decorative sheet can have a preferably excellent damage resistance in the processing and the practical use.

Even if the surface protection layer 14 is thicker than the conventional ones, the decorative sheet of the present invention obtains sufficiently high three-dimensional moldability. Therefore, the decorative sheet is useful for a member required to have a high film thickness on the surface protection layer, for example, for an automotive exterior.

The image layer 12 is formed by a typical printing such as gravure. The hiding layer is formed by a typical printing such as gravure; and typical application process such as gravure coating, gravure reverse coating, gravure offset coating, spinner coating, roll coating, and reverse roll coating.

The primer layer 13 and the adhesive layer are formed by typical application process such as gravure coating, gravure reverse coating, gravure offset coating, spinner coating, roll coating, reverse roll coating, kiss coating, wheeler coating, dip coating, solid coating by silk screen, wire bar coating, flow coating, comma coating, continuous flow coating, brush coating, and spray coating; and transfer coating process. In the transfer coating process, the coating film of the primer layer 13 or the adhesive layer is formed on a thin sheet (film substrate) and then covers the surface of a target layer of the decorative sheet 10.

The thickness of the image layer 12 is appropriately selected according to the design. The thickness of the hiding layer is preferably about 1-20 µm from the viewpoint of the three-dimensional moldability.

The thickness of the primer layer 13 is preferably about 0.1-10 µm. The primer layer with a thickness of 0.1 µm or more can substantially produces an effect to preventing a crack, breaking, whitening, and the like from being generated on the surface protection layer. On the other hand, the primer layer with a thickness of 10 µm or less does preferably not fluctuate the three-dimensional moldability because the coated film is stably dried and cured when the primer layer is applied. Therefore, the thickness of the primer layer is more preferably about 1-10 µm. For the same reason as the primer layer, the thickness of the adhesive layer is preferably about 0.1-10 µm.

The decorative sheet of the present invention can be used for various injection molding processes such as insert molding, simultaneous injection-molding and decorating, blow molding, and gas injection molding. The decorative sheet is suitably used for insert molding and simultaneous injection-molding and decorating.

In the insert molding, the decorative sheet of the present invention is subjected to previously vacuum forming (off-line preforming) to form the surface shape of a molded article with a vacuum forming mold. Then, the decorative sheet is trimmed excess off to obtain a molded sheet.

The molded sheet is inserted in an injection mold, and the injection mold is clamped. Then, a fluidized resin is injected and solidified in the mold. The decorative sheet is integrated with the outer surface of the formed resin composite at the same time of injection molding to produce a decorative resin-molded article.

The injection resin, typically polyolefin resins such as polyethylene and polypropylene; and thermoplastic resins such as an ABS resin, a styrene resin, a polycarbonate resin, an acrylic resin, and a vinyl chloride resin are used according to the application. Thermosetting resins such as a urethane resin and an epoxy resin can be used according to the application.

In the simultaneous injection-molding and decorating, the decorative sheet of the present invention is disposed on a female mold convertible to a vacuum forming mold in which a vacuum hole for injection molding is provided. The preforming (in-line preforming) is performed with this female mold, and then the injection mold is clamped. Then, a fluidized resin is injected, filled, and solidified in the mold. The decorative sheet is integrated with the outer surface of the molded resin product at the same time of injection molding to produce a decorative resin-molded article.

In the simultaneous injection-molding and decorating, the decorative sheet may receive a thermal pressure from the injected resin. When the decorative sheet, the drawing of which is small, is near the flat plate, the decorative sheet may not be preheated.

In the simultaneous injection-molding and decorating, the injection resin as explained in the description on the insert molding can be used.

The decorative resin-molded article of the present invention is formed by using the decorative sheet of the present invention and can be produced, for example, by the above-mentioned method. With no cracks being generated on the surface protection layer during the molding process, the decorative resin-molded article has excellent three-dimensional moldability, the surface of which has high damage resistance. The decorative resin-molded article also has high solvent resistance and chemical resistance. In the production process, the surface protection layer is completely cured at the phase of producing the decorative sheet. Therefore, the step of cross-linking and curing the surface protection layer is unnecessary after the decorative resin-molded article is produced. The decorative resin-molded article of the present invention is not limited in particular as long as being formed by using the decorative sheet of the present invention, which can be produced without any limitations to the above-mentioned production processes.

EXAMPLES

The present invention will be explained in more detail with reference to Examples and Comparative Examples below but is not limited thereto.

Evaluation Method (1) Three-Dimensional Moldability (Vacuum Forming)

The decorative sheet obtained in each of Examples and Comparative Examples was subjected to vacuum forming in the below-mentioned ways, and then the appearance was evaluated. The criterion is as follows.

AAA: No coating cracks or whitening was observed on the surface protection layer, and the shape excellently followed the mold.

AA: A minute coating crack or whitening was observed on a part of the three-dimensional part or the fully drawn part, but no practical problems were identified.

A: A minor coating crack or whitening was observed on a part of the three-dimensional part or the fully drawn part.

F: The shape did not follow the mold, and a coating crack and whitening were observed on the surface protection layer.

Vacuum Forming

The decorative sheet was heated and softened at 160° C. with an infrared heater. Subsequently, the decorative sheet was formed in the inner shape of the mold by vacuum forming at a maximum draw ratio of 150% by using a vacuum forming mold. The decorative sheet was cooled and then demolded.

(2) Damage Resistance (A)

The appearance of the test specimen was evaluated after scratched 5 times back and forth at a load of 1.5 kgf with #0000 steel wool. The criterion is as follows.

AAA: No flaws were observed.

AA: A minute flaw but no coating abrasion or whitening was observed on the surface.

A: A minor flaw was observed on the surface.

F: A significant flaw was observed on the surface.

(3) Damage resistance (B)

The appearance of the test specimen was evaluated after scratched 2000 times back and forth at a load of 500 gf with cotton fabric. The criterion is as follows.

AAA: No flaws were observed.

AA: A minute flaw but no coating abrasion or whitening was observed on the surface.

A: A minor flaw was observed on the surface.

F: A significant flaw was observed on the surface.

(4) Chemical Resistance

Ethanol was added dropwise to the surface of the decorative sheet obtained in each of Examples and Comparative Examples. The dropwisely added part was covered with a watch glass and left at room temperature (25° C.) for 1 hour. The watch glass was removed, and the dropwisely added part was evaluated. The criterion is as follows.

AA: No significant changes were observed on the coated film.

F: The coated film was swollen or detached.

(5) Measurement of Molecular Weight

A high speed GPC device available from TOSOH CORPORATION was used. The column used is also available from TOSOH CORPORATION, the brand name of which is "TSKgel αM." As the solvent, N-methyl-2-pyrrolidinone (NMP) was used. The measurement was conducted at a temperature of 40° C. and a flow rate of 0.5 cc/min. The weight-average molecular weight in the present invention was converted into a standard polystyrene equivalent.

Examples 1-7 and Comparative Examples 1-7

As the substrate, an ABS resin film (flexural modulus; 2000 MPa, thickness; 400 μm) was used to form an image layer with a grain pattern on the surface of the film by gravure by using acrylic resin compositions. Then, a primer layer consisting of a composition containing an acrylic polyol and hexamethylene diisocyanate was applied to the surface of the image layer by gravure coating. (The hexamethylene diisocyanate was mixed in the same NCO equivalent as the OH equivalent of the acrylic polyol). The thickness of the primer layer was 3 μm.

Then, the electron beam curable resin composition shown in Table 1 was applied to the surface of the primer layer by gravure coating so that the thickness (μm) of the resin composition after curing was as described in Table 1. This uncured resin layer was irradiated with electron beams with an irradiation dose of 50 kGy (5 Mrad) at an accelerating voltage of 165 kV to cure the electron beam curable resin composition. Then, 14 kinds of decorative sheets were obtained.

The decorative sheets were evaluated by the above-mentioned method. The evaluation results are shown in Table 1.

TABLE 1

|  |  | Examples | | | | | | | Comparative Examples | | | | | | |
| --- | --- | --- | --- | --- | --- | --- | --- | --- | --- | --- | --- | --- | --- | --- | --- |
|  |  | 1 | 2 | 3 | 4 | 5 | 6 | 7 | 1 | 2 | 3 | 4 | 5 | 6 | 7 |
| Resin composition | Electron beam curable resin I | 95 | 80 | 80 | 80 | 90 | — | — | 100 | 60 | 30 | 30 | 20 | — | — |
|  | Electron beam curable resin II | — | — | — | — | — | 95 | 80 | — | — | — | — | — | — | — |
|  | Electron beam curable resin III | 5 | 20 | 20 | 20 | — | — | 15 | — | 40 | 70 | — | — | 100 | — |
|  | Electron beam curable resin IV | — | — | — | — | 10 | 5 | 5 | — | — | — | 70 | — | — | 20 |
|  | Electron beam curable resin V | — | — | — | — | — | — | — | — | — | — | — | 80 | — | 80 |
| Additive | Reactive silicone | — | — | 1 | — | — | — | — | — | — | — | — | 1 | — | 1 |
|  | Silicone oil | — | — | — | 1 | — | — | — | — | — | — | — | — | — | — |
| Thickness of curable resin composition after curing (μm) | | 10 | 5 | 5 | 5 | 10 | 10 | 5 | 10 | 10 | 10 | 5 | 10 | 8 | 10 |
| Evaluation Result | Three-dimensional moldability | AAA | AA | AA | AA | AAA | AA | AA | AA | F | F | F | AAA | F | A |
|  | Damage resistance A | AA | AA | AA | AA | AAA | AA | AA | A | A | F | F | F | F | F |
|  | Damage resistance B | AA | AA | AAA | AAA | AAA | AAA | AAA | F | AA | AA | AAA | F | AA | AA |
|  | Chemical resistance | AA | AA | AA | AA | AA | AA | AA | F | AA | AA | AA | F | AA | F |

Electron Beam Curable Resin I
  Urethane acrylate with a polycarbonate skeleton and two functional groups
    Weight-average molecular weight: 8,000
  Composition
    Polyol with polycarbonate skeleton
    Polyol formed by polymerizing the following components
      Diol compound (X): 1,4-butanediol
      Compound to be a carbonyl component (Z): Diethyl carbonate
    Organic polyisocyanate compound
      Hexamethylene diisocyanate
    Hydroxy(meth)acrylate
      2-hydroxyethyl methacrylate
Electron Beam Curable Resin II
  Urethane acrylate with a polycarbonate skeleton and six functional groups
    Weight-average molecular weight: 7,000
  Composition
  Polyol with Polycarbonate Skeleton
    Polyol formed by polymerizing the following components
      Diol compound (X): 1,6-hexanediol
      Compound to be a carbonyl component (Z): Dimethyl carbonate
    Organic polyisocyanate compound
      Hexamethylene diisocyanate
    Hydroxy(meth)acrylate
      2-hydroxyethyl methacrylate
Electron Beam Curable Resin III
  Urethane acrylate oligomer with six functional groups
    Weight-average molecular weight: 6,000
Electron beam curable resin IV
  Silicone modification urethane acrylate with six functional groups
    Weight-average molecular weight: 6,000
Electron beam curable resin V
  Urethane acrylate oligomer with two functional groups
    Weight-average molecular weight: 10,000
Reactive Silicone
  Silicone with a methacrylate at the end Silicone oil (non-reactive)
  Silicone with a methyl group at the end The decorative sheet of the present invention exhibited excellent three-dimensional moldability without no cracks being generated in typical insert molding and simultaneous injection-molding and decorating, even under the conditions of rapid temperature drop from a heating temperature of about 160° C. to that at the contact with a mold, a rapid extension rate, and a high degree of drawing rate. It was confirmed that the surfaces of the produced decorative resin-molded articles had high damage resistance.

INDUSTRIAL APPLICABILITY

The decorative sheet of the present invention is used for various decorative resin-molded articles, suitably for use in, for example, the interior or exterior material of a vehicle such as an automobile; carpentry members such as a base board and a cornice; fittings such as a window and a door frames; interior materials in a building, such as a wall, a floor, and a ceiling; housings for home electric appliances such as a television set and an air conditioner; and a container.

REFERENCE SIGNS LIST

10 Decorative sheet
11 Substrate
12 Image layer
13 Primer layer
14 Surface protection layer

The invention claimed is:

1. A decorative sheet comprising a surface protection layer and a substrate, the surface protection layer being provided on the substrate, wherein the surface protection layer consists of a cured material of an ionizing radiation curable resin composition comprising a urethane(meth)acrylate with a polycarbonate skeleton (A) and a multi-functional (meth)acrylate (B) in a mass ratio ((A)/(B)) of (98/2)-(70/30), wherein the urethane(meth)acrylate with a polycarbonate skeleton (A) has a weight-average molecular weight of more than 2,000, whereby the surface protection layer has properties of damage resistance and three-dimensional moldability.

2. The decorative sheet according to claim 1, wherein the multi-functional (meth)acrylate (B) has three or more functional groups.

3. The decorative sheet according to claim 1, wherein the urethane(meth)acrylate with a polycarbonate skeleton (A) has a weight-average molecular weight of 5,000 to 20,000.

4. The decorative sheet according to claim 1, wherein the multi-functional (meth)acrylate (B) is a silicone-modified urethane(meth)acrylate.

5. The decorative sheet according to claim 1, wherein said mass ratio ((A)/(B)) is (95/5)-(80/20).

6. The decorative sheet according to claim 5, wherein said mass ratio ((A)/(B)) is (95/5)-(85/15).

7. The decorative sheet according to claim 1, further comprising a primer layer provided between the substrate and the surface protection layer.

8. The decorative sheet according to claim 7, further comprising an image layer provided between the substrate and the primer layer.

9. The decorative sheet according to claim 1, wherein the surface protection layer has a thickness of 1-1,000 μm.

10. The decorative sheet according to claim 1, wherein the surface protection layer has a thickness of 1-50 μm.

11. The decorative sheet according to claim 1, wherein the urethane(meth)acrylate with a polycarbonate skeleton (A) has at least two functional groups of ethylene unsaturated bonds in a molecule.

12. A decorative resin-molded article comprising the decorative sheet according to claim 1.

* * * * *